United States Patent
Woodland et al.

(10) Patent No.: US 11,130,403 B1
(45) Date of Patent: Sep. 28, 2021

(54) ONE-PEDAL DRIVE SYSTEM FOR A VEHICLE

(71) Applicant: FORD GLOBAL TECHNOLOGIES, LLC, Dearborn, MI (US)

(72) Inventors: Brandon Jay Woodland, Livonia, MI (US); Sergey Gennadievich Semenov, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/035,099

(22) Filed: Sep. 28, 2020

(51) Int. Cl.
| | | |
|---|---|---|
| *B60W 20/00* | (2016.01) | |
| *B60W 10/18* | (2012.01) | |
| *B60K 6/48* | (2007.10) | |
| *B60W 10/04* | (2006.01) | |
| *B60K 26/02* | (2006.01) | |
| *B60T 7/04* | (2006.01) | |
| *B60T 7/06* | (2006.01) | |

(52) U.S. Cl.
CPC ............ *B60K 26/02* (2013.01); *B60T 7/042* (2013.01); *B60T 7/06* (2013.01); *B60W 10/18* (2013.01)

(58) Field of Classification Search
CPC ........ B60K 26/02; B60W 10/18; B60T 7/042; B60T 7/06
See application file for complete search history.

(56) References Cited

U.S. PATENT DOCUMENTS

| | | | | |
|---|---|---|---|---|
| 6,364,434 | B1 * | 4/2002 | Sway-Tin | B60W 10/18 303/152 |
| 10,369,888 | B2 | 8/2019 | Kuang et al. | |
| 2009/0118885 | A1 * | 5/2009 | Heap | B60K 6/365 701/22 |
| 2009/0118887 | A1 * | 5/2009 | Minarcin | B60L 7/26 701/22 |
| 2012/0109479 | A1 * | 5/2012 | Ganley | B60L 7/26 701/70 |
| 2017/0361827 | A1 * | 12/2017 | Crombez | B60W 20/00 |

(Continued)

FOREIGN PATENT DOCUMENTS

| | | | |
|---|---|---|---|
| CN | 110385997 A | 10/2019 | |
| FR | 2822763 A1 * | 4/2002 | ............ B60W 10/02 |
| WO | WO 2020028487 A1 * | 2/2020 | |

OTHER PUBLICATIONS

EPO Machine Translation of FR2822763A1, Rieger et al., Apr. 10, 2002 (Year: 2002).*

*Primary Examiner* — Vinh Luong

(74) *Attorney, Agent, or Firm* — David B Kelley; Brooks Kushman P.C.

(57) ABSTRACT

A vehicle comprising, an accelerator pedal, a brake pedal, an electric machine, and a controller. The electric machine is configured to propel the vehicle and to brake the vehicle via regenerative braking. The controller is programmed to, in response to releasing the accelerator pedal, increase a regenerative braking torque of the electric machine to a first value. The controller is further programmed to, in response to depressing the brake pedal, increase the regenerative braking torque of the electric machine from the first value to a second value. The controller is further programmed to, in response to a speed of the vehicle decreasing to less than a first threshold, decrease the regenerative braking torque of the electric machine from the second value to the first value.

18 Claims, 3 Drawing Sheets

(56) References Cited

U.S. PATENT DOCUMENTS

| | | |
|---|---|---|
| 2019/0106103 A1 | 4/2019 | Inoue et al. |
| 2021/0053552 A1* | 2/2021 | Szczepaniak ......... B60W 10/18 |
| 2021/0086628 A1* | 3/2021 | Kava ....................... B60L 58/13 |
| 2021/0086736 A1* | 3/2021 | Yao ........................ B60T 13/665 |

* cited by examiner

ONE-PEDAL DRIVE SYSTEM FOR A VEHICLE

TECHNICAL FIELD

The present disclosure relates to hybrid/electric vehicles and one-pedal drive systems for hybrid/electric vehicles.

BACKGROUND

Hybrid/electric vehicles may include one-pedal drive systems that are configured to brake the vehicle in response to releasing the accelerator pedal and without application of the brake pedal.

SUMMARY

A vehicle comprising, an accelerator pedal, a brake pedal, an electric machine, friction brakes, and a controller. The electric machine is configured to propel the vehicle in response to depressing the accelerator pedal and to brake the vehicle via regenerative braking in response to releasing the accelerator pedal according to a one-pedal driving operation. The friction brakes are configured to brake the vehicle in response to depressing the brake pedal. The controller is programmed to, in response to releasing the accelerator pedal without depressing the brake pedal and while the vehicle is in motion, increase a regenerative braking torque of the electric machine to a first value. The controller is further programmed to, in response to depressing the brake pedal while the electric machine is generating regenerative braking torque at the first value and while the accelerator pedal is released, increase the regenerative braking torque of the electric machine from the first value to a second value. The controller is further programmed to, in response to a speed of the vehicle decreasing to less than a first threshold while the brake pedal is depressed, the accelerator pedal is released, and the electric machine is generating regenerative braking torque at the second value, decrease the regenerative braking torque of the electric machine from the second value to the first value. The controller is further programmed to, in response to the speed of the vehicle decreasing to less than a second threshold that is less than the first threshold while the brake pedal is depressed, the accelerator pedal is released, and the electric machine is generating regenerative braking torque at the first value, decrease the regenerative braking torque of the electric machine from the first value to a third value required to vehicle stationary on a detected road grade.

A vehicle comprising, an accelerator pedal, a brake pedal, an electric machine, and a controller. The electric machine is configured to propel the vehicle and to brake the vehicle via regenerative braking. The controller is programmed to, in response to releasing the accelerator pedal, increase a regenerative braking torque of the electric machine to a first value. The controller is further programmed to, in response to depressing the brake pedal, increase the regenerative braking torque of the electric machine from the first value to a second value. The controller is further programmed to, in response to a speed of the vehicle decreasing to less than a first threshold, decrease the regenerative braking torque of the electric machine from the second value to the first value.

A vehicle comprising, an accelerator pedal, a brake pedal, an electric machine, friction brakes, and a controller. The electric machine is configured to propel the vehicle and to brake the vehicle via regenerative braking. The controller is programmed to, in response to releasing the accelerator pedal, increase a regenerative braking torque of the electric machine to a first value. The controller is further programmed to, in response to depressing the brake pedal during the regenerative braking, increase the regenerative braking torque of the electric machine from the first value to a second value. The controller is further programmed to, in response to a speed of the vehicle decreasing to less than a first threshold during the regenerative braking, decrease the regenerative braking torque of the electric machine from the second value to the first value and increase a torque of the friction brakes by a difference between the second value and the first value.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
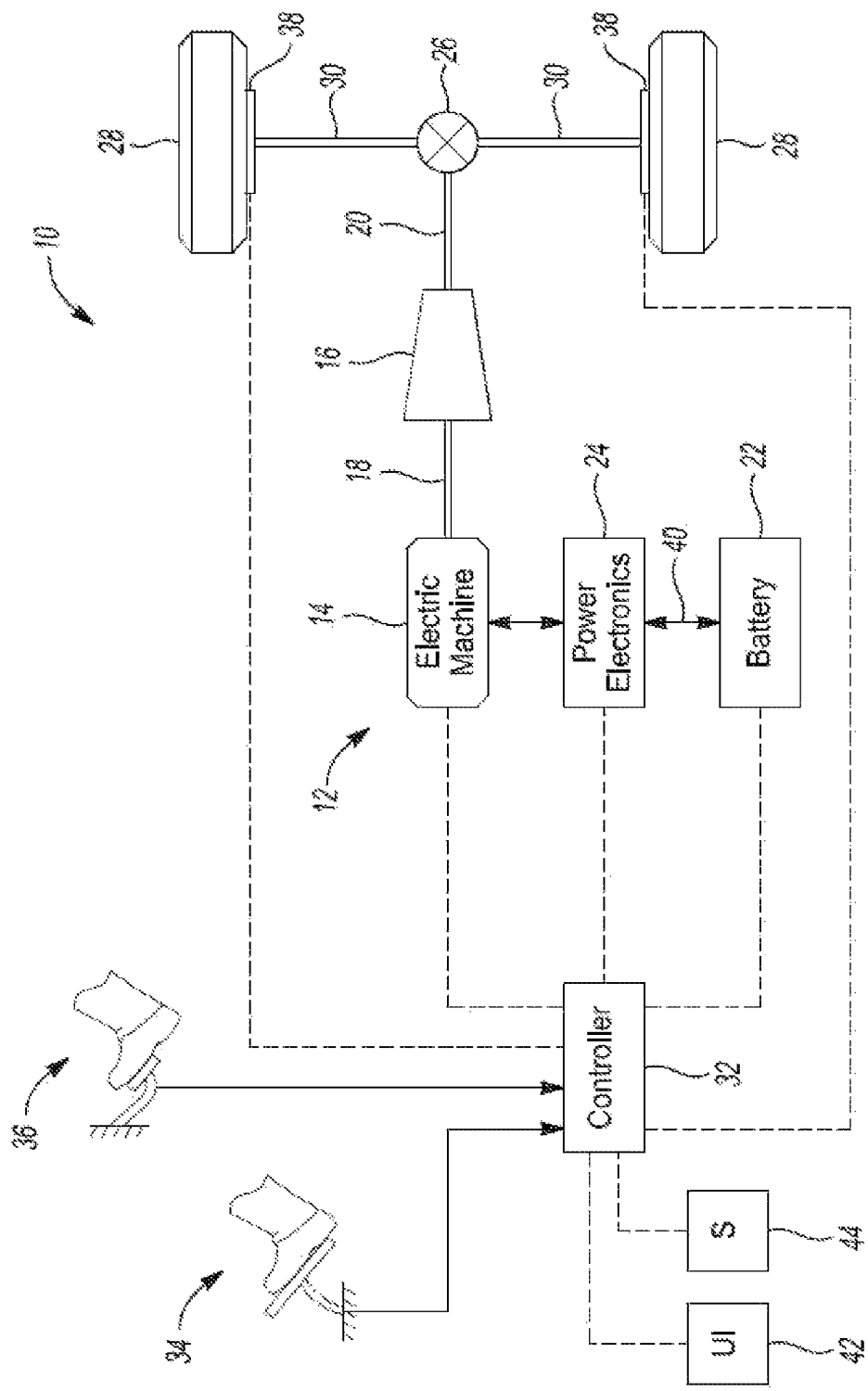
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission or a continuously variable transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The M/G 14 is configured to deliver power to the wheels 28 to drive the vehicle 10 via the various connections described above. It should be understood that the connections between the M/G 14 and the wheels 28 described herein is for illustrative purposes only and that other drivetrain configurations between the M/G 14 and the wheels 28 may be implemented in the alternative.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or torque, or a demand for decreased power or torque, respectively. Stated in other terms, increasing an amount of depression of the accelerator pedal is configured to generate a command to increase the speed of the vehicle 10 while decreasing an amount of depression of the accelerator pedal is configured to generate a command to decrease the speed of the vehicle 10. A brake pedal 36 is also used by the driver of the vehicle to provide a demanded braking torque to slow or decrease the speed of the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The friction brakes 38 are configured to apply torque to the wheels in response to depression of the brake pedal 36 in order to slow or brake the vehicle 10. The controller 32 also controls the timing of gear shifts within the transmission 16.

The M/G 14 may act as a motor and provide a driving force for the powertrain 12. To drive or propel the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22. Regenerative braking also results in slowing or braking the vehicle.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

The vehicle 10 may include a sensor 44, such as an accelerometer, that is configured to determine a gradient of a road surface that the vehicle 10 is positioned on. More specifically, the sensor 44 may be configured to detect a pitch angle of the vehicle 10. The sensor 44 may be configured to communicate the road gradient and/or pitch angle of the vehicle 10 to the controller 32.

The vehicle 10 may include a one-pedal drive mode or system. In the one-pedal drive mode, the speed of the vehicle may be increased in response to increasing a depressed position of the accelerator pedal 34 while releasing the accelerator pedal 34 results in braking the vehicle 10 via regenerative braking through the M/G 14. More specifically, the vehicle 10 may be slowed or braked, including bringing the vehicle 10 to a complete stop, via releasing the accelerator pedal 34 alone without an application or depression of the brake pedal 36.

The vehicle 10 may include a user interface 42, such as control panel, touch screen, push button, etc. that is in communication with the controller 32. The controller 32 may be configured to enable and disable the one-pedal driving mode based on an operator selected input from the user interface 42.

One-pedal drive (1PD) is a feature, which gives control to the accelerator pedal to increase regenerative braking and to bring the vehicle to a stop without input from the brake pedal on a range of grades. The one-pedal drive low speed controller (LSC), which may be part of the one or more controllers that includes controller 32, controls the vehicle to a complete stop from low speeds by adjusting the powertrain torque when the vehicle is in a one-pedal drive mode and the customer has tipped out of the accelerator pedal.

The torque used to slow down the vehicle in response to releasing the accelerator pedal, which may be referred to as A-term regenerative braking torque, may be limited due to functional considerations. Therefore, it may be necessary for the driver to apply the brake pedal to increase the rate at which the vehicle slows down. When the brake pedal is applied, some of the additional braking torque may still be provided by the regenerative braking system up to a maximum under the conditions. The additional regenerative braking torque requested through the brake pedal may be referred to as the B-term regenerative braking torque.

In all drive modes, when the brake pedal is applied, and regenerative braking is allowed, the wheel torque request from the brake pedal may be added to the A-term regenerative braking torque to compute the total regenerative braking torque. Outside of the one-pedal drive mode, the allowable regen is ramped out gradually as a function of vehicle speed until only friction braking is used below a low speed threshold. However, in the one-pedal drive mode, regenerative braking may be allowed down to zero speed so that the powertrain is able to stop the vehicle without engaging the friction brakes. This may present an issue when B-term regenerative braking torque is requested during a one-pedal drive stop. Without a mechanism to smoothly ramp out the B-term regenerative braking torque, it may be possible to request negative powertrain torque (i.e., regenerative braking torque) through the brake pedal even after the vehicle has stopped, which could result in an unintended vehicle acceleration against the direction of the selected gear.

When the one-pedal drive mode is active, and the additional B-term regenerative braking torque is requested through the brake pedal, three phases may take place to slow the vehicle to a stop: (1) the B-term regenerative braking torque is added to the A-term regenerative braking torque; (2) the B-term regenerative braking torque is blended out smoothly into the A-term regenerative braking torque request via a calibration table; and (3) the A-term regenerative braking torque is blended out.

Four key strategy elements are utilized to achieve a smooth slowing down of the vehicle: (1) the allowable B-term regenerative braking torque is removed as a function of vehicle speed using a calibration table. It is calibrated to intersect the A-term blend out ramp for a smooth, continuous reduction of regenerative braking torque towards the end of stop; (2) the LSC feedback control is frozen but continues to be calculated in case the brake pedal is released, and normal LSC operation is required to bring the vehicle to a stop (however, it should be noted that any compensation torque for road grade is still applied); (3) a filter constant and rate limit are applied to the A-term regenerative braking torque as it ramps down to an appropriate value to stop on the road grade according to the LSC; and (4) supplemental friction braking is added during the torque phase that includes both A-term and B-term regenerative braking torque and during the B-term blend out phase.

Item one of the four key strategy elements prevents unintended vehicle acceleration against the gear direction by ensuring that no negative wheel torque is requested through the brake pedal at low vehicle speed. It also ensures that B-term regenerative braking torque is removed slowly enough to allow a smooth transition as B-term powertrain torque is replaced by friction torque. Item two of the four key strategy elements ensures that the LSC does not use feedback control to attempt to force the vehicle to slow down along a prescribed speed profile when a faster rate of slowing the vehicle is being requested through the brake pedal. The road grade compensation torque remains active in the A-term to deliver a consistent stopping feel on a range of road grades and to ensure that, if the brake pedal is suddenly released, the LSC may smoothly resume feedback control from a reasonable starting value, in accordance with the detected road grade. Item three of the four key strategy elements ensures that the A-term regenerative braking torque ramps to its final value by the time the vehicle speed reaches zero. Retaining the slower filter constant of the brake-off one-pedal drive case would result in the A-term regenerative braking torque lagging behind the vehicle speed and remaining too negative after the stop was achieved. This would result in a clunk just after the stop, as the A-term regenerative braking torque finished ramping out. Another reason to ramp the A-term regenerative braking torque to its final value more quickly in the brake-on one-pedal drive stop is to ensure that the torque is not lower than what is necessary to hold the vehicle on a grade without brake pedal (the final value calculated by the LSC). If the brake pedal was suddenly released near the end of stop with a lagging A-term regenerative braking torque, an unintended vehicle acceleration could occur. Note that on some positive grades, A-term torque may change from regenerative braking to slow the vehicle to forward acceleration to act against gravity on the positive grade in order to stop and hold a stationary position of the vehicle on the grade. Item four of the four key strategy elements ensures consistent additive vehicle slowing request through the brake pedal. When both A-term and B-term are present, this allows the brake pedal to be used to request additional stopping torque when the powertrain regenerative braking torque is limited. When the B-term torque is being blended out, this allows the friction brakes to blend in torque at the same rate so that the stopping force remains constant during the transition from A-term and B-term to only A-term.

Figure 2:
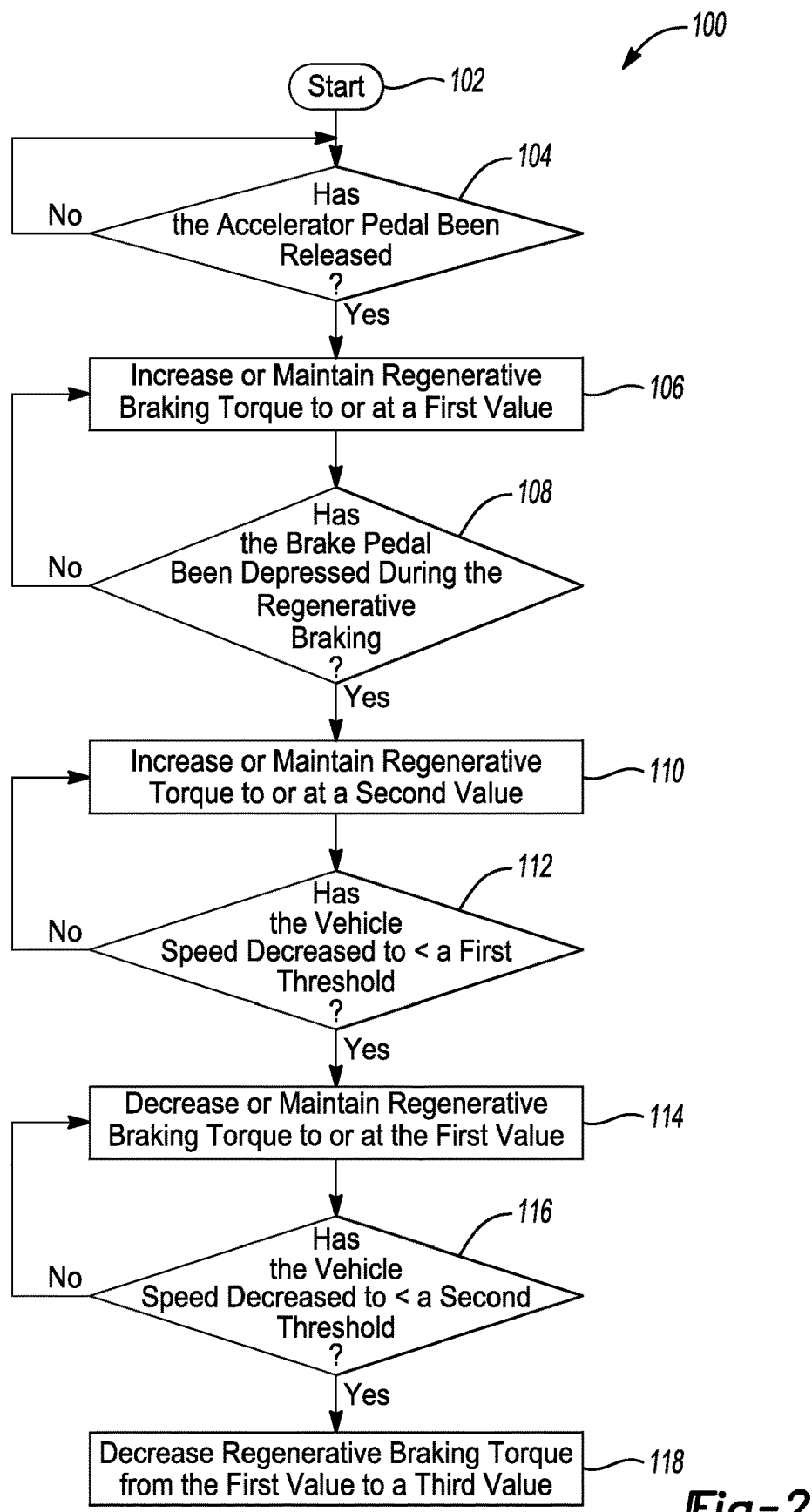
FIG. 2 is a flowchart illustrating a method for controlling regenerative torque in a hybrid/electric vehicle having a one-pedal drive system.
Figure 3:
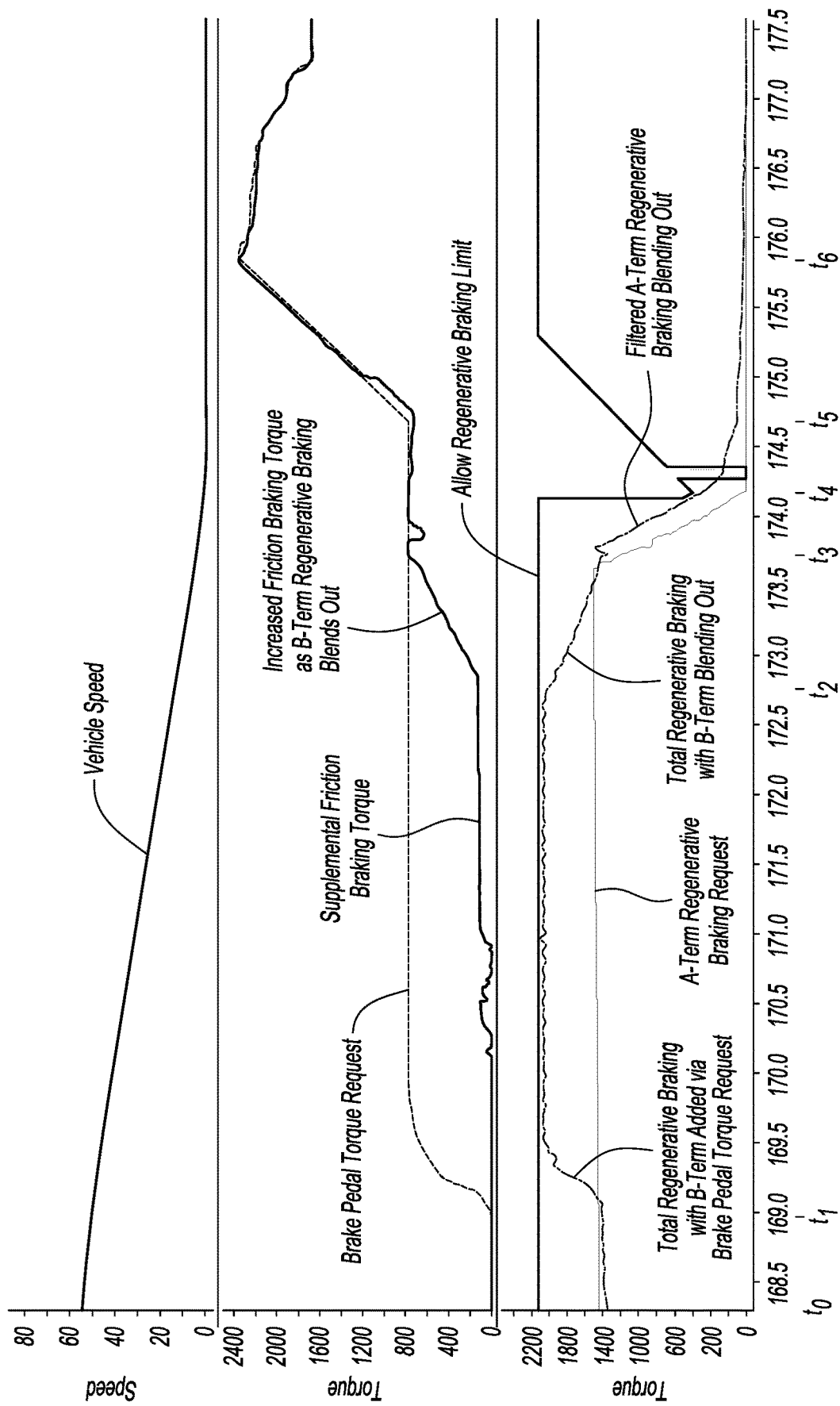
FIG. 3 is a series of graphs illustrating regenerative and friction braking torque values while implementing the method of FIG. 2.

Referring to FIGS. 2 and 3, a flowchart of a method 100 for controlling regenerative braking in the vehicle 10 and a series of graphs including regenerative and friction braking torque values while implementing the method 100 are illustrated, respectively. The method 100 may be stored as control logic and/or an algorithm within the controller 32. The controller 32 may implement the method 100 by controlling the various components of the vehicle 10. The method 100 is initiated at start block 102. The method 100 may be initiated at start block 102 by turning a start key or ignition of the vehicle 10 to an "on" position. The method 100 then moves on to block 104 where it is determined if the accelerator pedal 34 has been released. More specifically, at block 104 it may be determined if the accelerator pedal 34 was released without depressing the brake pedal 36 (i.e., without a braking torque request from the brake pedal 36) and while the vehicle 10 is in motion. If the answer at block 104 is NO, the method 100 recycles back to the beginning of block 104. If the answer at block 104 is YES, the method 100 moves on to block 106 where the regenerative braking torque of the M/G 14 is increased to a first value. The first value may be referred to as the A-term regenerative braking torque request and may be a preset one-pedal drive regenerative braking value or limit that is set to less than an allowable regenerative braking limit of the M/G 14. Such a scenario where the regenerative braking torque of the M/G 14 is driven to the A-term regenerative braking torque request in response to releasing the accelerator pedal 34 without depressing the brake pedal 36 and while the vehicle is in motion is illustrated between times $t_0$ and $t_1$ in FIG. 3.

Next, the method 100 moves on to block 108 where it is determined if the brake pedal 36 has been depressed during the regenerative braking. More specifically, at block 108 it may be determined if the brake pedal 36 has been depressed while the M/G 14 is generating regenerative braking torque at the first value and while the accelerator pedal 34 is released. If the answer at block 108 is NO, the method 100 recycles back to the beginning of block 106, where the regenerative braking torque of the M/G 14 is maintained at the first value. If the answer at block 108 is YES, the method 100 moves on to block 110 where the regenerative braking torque of the M/G 14 is increased from the first value to a second value. The difference between the first value and the second value may be referred to as the B-term regenerative braking torque request. The B-term regenerative braking torque request may be any value that results from the brake pedal torque request that may increase the total regenerative braking from the A-term regenerative braking torque request to any value up to the allowable regenerative braking torque upper limit of the M/G 14.

If the brake pedal torque request exceeds the difference between the A-term regenerative braking torque request and the allowable regenerative braking torque upper limit of the M/G 14, the additional braking torque of the brake pedal torque request may be accomplished by increasing the braking torque of the friction bakes 38 to a value which may be referred to as the supplemental friction braking torque. Such a scenario where the regenerative braking torque of the M/G 14 is driven to a value that is equal to the A-term plus the B-term regenerative braking torque requests in response to depressing the brake pedal 36 while the M/G 14 is generating regenerative braking torque at the first value and while the accelerator pedal is released is illustrated between times $t_1$ and $t_2$ in FIG. 3. Also, during the time period between times $t_1$ and $t_2$, the torque of the friction bakes 38 (i.e., the supplemental friction braking torque) is increased to account for the additional braking torque of the brake pedal torque request.

Next, the method 100 moves on to block 112 where it is determined if a speed of the vehicle 10 has decreased to less than a first speed threshold during the regenerative braking. More specifically, at block 112 it may be determined if the speed of the vehicle 10 has decreased to less than the first speed threshold while the brake pedal 36 is depressed, the accelerator pedal 34 is released, and the M/G 14 is generating regenerative braking torque at the second value. If the answer at block 112 is NO, the method 100 recycles back to the beginning of block 110, where the regenerative braking torque of the M/G 14 is maintained at the second value. If the answer at block 112 is YES, the method 100 moves on to block 114 where the regenerative braking torque of the M/G 14 is decreased from the second value back to the first value (i.e., the B-term regenerative braking torque request is phased or blended out).

Also, at block 114 the torque of the friction brakes 38 may be increased by a value that is equal to the difference between the second value and the first value (i.e., the torque of the friction brakes 38 may be increased by a value that is equal to the B-term regenerative braking torque request that is phased or blended out) in order to account for the reduction in regenerative braking torque of the M/G 14 and to ensure that the entire brake pedal torque request is met collectively by the M/G 14 and the friction brakes 38.

Such a scenario where the regenerative braking torque of the M/G 14 is decreased by the B-term regenerative braking torque request and the torque of the friction brakes 38 is increased by a value that is equal to the B-term regenerative braking torque request is illustrated between times $t_2$ and $t_3$ in FIG. 3. The regenerative braking torque of the M/G 14 may be decreased from the second value to the first value (i.e., may be decreased by a value equal to the B-term) gradually at a calibrated rate over the time period between times $t_2$ and $t_3$, and the torque of the friction brakes 38 may be increased by the value that is equal to the difference between the second value and the first value (i.e., the torque of the friction brakes 38 may be increased by a value equal to the B-term regenerative braking torque request) at a calibrated rate over the time period between times $t_2$ and $t_3$.

Next, the method 100 moves on to block 116 where it is determined if a speed of the vehicle 10 has decreased to less than a second speed threshold that is less than the first speed threshold during the regenerative braking. More specifically, at block 116 it may be determined if the speed of the vehicle 10 has decreased to less than the second speed threshold while the brake pedal 36 is depressed, the accelerator pedal 34 is released, and the M/G 14 is generating regenerative braking torque at the first value. If the answer at block 116 is NO, the method 100 recycles back to the beginning of block 114, where the regenerative braking torque of the M/G 14 is maintained at the first value. If the answer at block 116 is YES, the method 100 moves on to block 118 where the regenerative braking torque of the M/G 14 is decreased from the first value a third value required to hold the vehicle stationary on the detected road grade (i.e., the A-term regenerative braking torque request is phased or blended out).

Also, at block 116 the torque of the friction brakes 38 may be increased by a value that is equal to at least the first value (i.e., the torque of the friction brakes 38 may be increased by a value that is equal to or greater than the A-term regenerative braking torque request that is phased or blended out) in order to account for the reduction in regenerative braking torque of the M/G 14 and to ensure that the entire brake pedal torque request is met by the friction brakes 38.

Such a scenario where the regenerative braking torque of the M/G 14 is decreased by the A-term regenerative braking torque request to a grade-compensated torque, resulting in net zero acceleration on the detected road grade, and the torque of the friction brakes 38 is additionally increased, is illustrated between times $t_3$ and $t_6$ in FIG. 3. There may be a lag between decreasing the regenerative braking torque of the M/G 14 and increasing the torque of the friction brakes 38 at block 118. For example, the regenerative braking torque of the M/G 14 may first be decreased between times $t_3$ and $t_4$, which is followed by the increase in the torque of the friction brakes 38, between times $t_5$ and $t_6$, which occurs after the period between times $t_3$ and $t_4$. The regenerative braking torque of the M/G 14 may be decreased from the first value to the third value required to hold the vehicle stationary on the detected road grade gradually at a calibrated rate over the time period between times $t_3$ and $t_4$, and the torque of the friction brakes 38 may be increased by the value that is equal to at least the first value (i.e., may be increased by a value equal to or greater than the A-term regenerative braking torque request) at a calibrated rate over the time period between times $t_5$ and $t_6$. Alternatively, the torque of the friction brakes 38 may be increased to a calibrated value that is at least sufficient to hold the vehicle stationary on the detected grade.

An absolute value of the calibrated rate at which the regenerative braking torque of the M/G 14 may be decreased from the first value to the third value required to hold the vehicle stationary on the detected road grade over the time period between times $t_3$ and $t_4$ at block 118 may be greater than an absolute value of the calibrated rate at which the regenerative braking torque of the M/G 14 may be decreased from the second value to the first value over the time period between times $t_2$ and $t_3$ at block 114. An absolute value of the calibrated rate at which the torque of the friction brakes 38 may be increased by the value that is equal to at least the first value over the time period between times $t_5$ and $t_6$ at block 118 may be greater than an absolute value of the calibrated rate at which the torque of the friction brakes 38 may be increased by the value that is equal to the difference between the second value and the first value over the time period between times $t_2$ and $t_3$ at block 114.

It should be understood that the flowchart in FIG. 2 is for illustrative purposes only and that the method 100 should not be construed as limited to the flowchart in FIG. 2. Some of the steps of the method 100 may be rearranged while others may be omitted entirely. For example, if the speed of the vehicle 10 were to drop to less than the second threshold without application of the brake pedal, the method 100 may move immediately from any block within the method 100 directly to block 118. Also, if the brake pedal were to be released at any time between blocks 110 and 118, the method 100 may undergo a smooth transition to the first value in block 106. As another example, the method 100 may return to start block 102 in response to a depression of the accelerator pedal.

It should be understood that the designations of first, second, third, fourth, etc. for any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an accelerator pedal;
   a brake pedal;
   an electric machine configured to propel the vehicle in response to depressing the accelerator pedal and to brake the vehicle via regenerative braking in response to releasing the accelerator pedal according to a one-pedal driving operation;
   friction brakes configured to brake the vehicle in response to depressing the brake pedal; and
   a controller programmed to,
      in response to releasing the accelerator pedal without depressing the brake pedal and while the vehicle is in motion, increase a regenerative braking torque of the electric machine to a first value,
      in response to depressing the brake pedal while the electric machine is generating regenerative braking torque at the first value and while the accelerator pedal is released, increase the regenerative braking torque of the electric machine from the first value to a second value, wherein the second value is greater than the first value and less than or equal to a regenerative braking torque upper limit,
      in response to a speed of the vehicle decreasing to less than a first threshold while the brake pedal is depressed, the accelerator pedal is released, and the electric machine is generating regenerative braking torque at the second value, decrease the regenerative braking torque of the electric machine from the second value to the first value, and
      in response to the speed of the vehicle decreasing to less than a second threshold that is less than the first threshold while the brake pedal is depressed, the accelerator pedal is released, and the electric machine is generating regenerative braking torque at the first value, decrease the regenerative braking torque of the electric machine from the first value to a third value required to hold the vehicle stationary on a detected road grade.

2. The vehicle of claim 1, wherein the controller is programmed to decrease the regenerative braking torque of the electric machine from the second value to the first value at a first rate.

3. The vehicle of claim 2, wherein the controller is programmed to decrease the regenerative braking torque of the electric machine from the first value to the third value at a second rate.

4. The vehicle of claim 3, where an absolute value of the second rate is greater than an absolute value of the first rate.

5. The vehicle of claim 1, wherein the controller is programed to, in response to decreasing the regenerative braking torque of the electric machine from the second value to the first value, increase a torque of the friction brakes by a difference between the second value and the first value.

6. The vehicle of claim 1, wherein the controller is programed to, in response to decreasing the regenerative braking torque of the electric machine from the first value to the third value, increase a torque of the friction brakes to greater than or equal to a value required to hold the vehicle stationary on the detected road grade.

7. A vehicle comprising:
   an accelerator pedal;
   a brake pedal;
   friction brakes;
   an electric machine configured to propel the vehicle and to brake the vehicle via regenerative braking; and
   a controller programmed to,
      in response to releasing the accelerator pedal, increase a regenerative braking torque of the electric machine to a first value,
      in response to depressing the brake pedal, increase the regenerative braking torque of the electric machine from the first value to a second value,
      in response to a speed of the vehicle decreasing to less than a first threshold, decrease the regenerative braking torque of the electric machine from the second value to the first value, and
      in response to decreasing the regenerative braking torque of the electric machine from the second value to the first value, increase a torque of the friction brakes by a difference between the second value and the first value.

8. The vehicle of claim 7, wherein the controller is programed to, in response to the speed of the vehicle decreasing to less than a second threshold that is less than the first threshold, decrease the regenerative braking torque of the electric machine from the first value to a third value required to hold the vehicle stationary on a detected road grade.

9. The vehicle of claim 8, wherein the controller is programmed to decrease the regenerative braking torque of the electric machine from the second value to the first value at a first rate.

10. The vehicle of claim 9, wherein the controller is programmed to decrease the regenerative braking torque of the electric machine from the first value to third value at a second rate.

11. The vehicle of claim 10, where an absolute value of the second rate is greater than an absolute value of the first rate.

12. The vehicle of claim 8, wherein the controller is programed to, in response to decreasing the regenerative braking torque of the electric machine from the first value to the third value, increase a torque of the friction brakes to greater than or equal to a value required to hold the vehicle stationary on the detected road grade.

13. The vehicle of claim 7, wherein the second value is greater than the first value and less than or equal to a regenerative braking torque upper limit.

14. A vehicle comprising:
an accelerator pedal;
a brake pedal;
an electric machine configured to propel the vehicle and to brake the vehicle via regenerative braking;
friction brakes; and
a controller programmed to,
in response to releasing the accelerator pedal, increase a regenerative braking torque of the electric machine to a first value,
in response to depressing the brake pedal during the regenerative braking, increase the regenerative braking torque of the electric machine from the first value to a second value, and
in response to a speed of the vehicle decreasing to less than a first threshold during the regenerative braking, decrease the regenerative braking torque of the electric machine from the second value to the first value and increase a torque of the friction brakes by a difference between the second value and the first value.

15. The vehicle of claim 14, wherein the controller is programed to, in response to the speed of the vehicle decreasing to less than a second threshold that is less than the first threshold during the regenerative braking, decrease the regenerative braking torque of the electric machine from the first value to a third value required to hold the vehicle stationary on a detected road grade.

16. The vehicle of claim 15, wherein the controller is programmed to decrease the regenerative braking torque of the electric machine from the second value to the first value at a first rate.

17. The vehicle of claim 16, wherein the controller is programmed to decrease the regenerative braking torque of the electric machine from the first value to the third value at a second rate.

18. The vehicle of claim 17, where an absolute value of the second rate is greater than an absolute value of the first rate.

* * * * *